Oct. 15, 1940.   C. O. FAIRCHILD   2,218,464
THROTTLING REGULATOR FOR ELECTRIC FURNACES
Filed Dec. 14, 1937    2 Sheets-Sheet 2
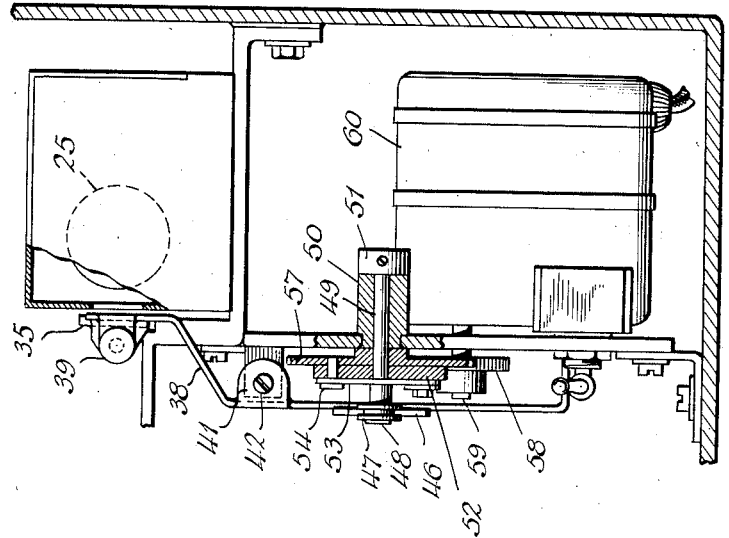
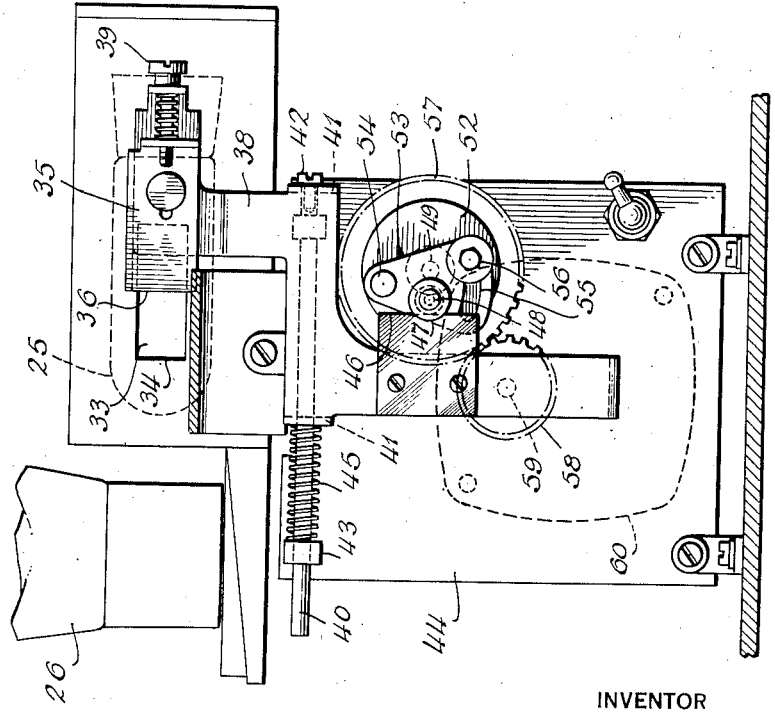
INVENTOR
CHARLES O. FAIRCHILD
BY
ATTORNEYS
WITNESS:
Ed S. Smith Jr.

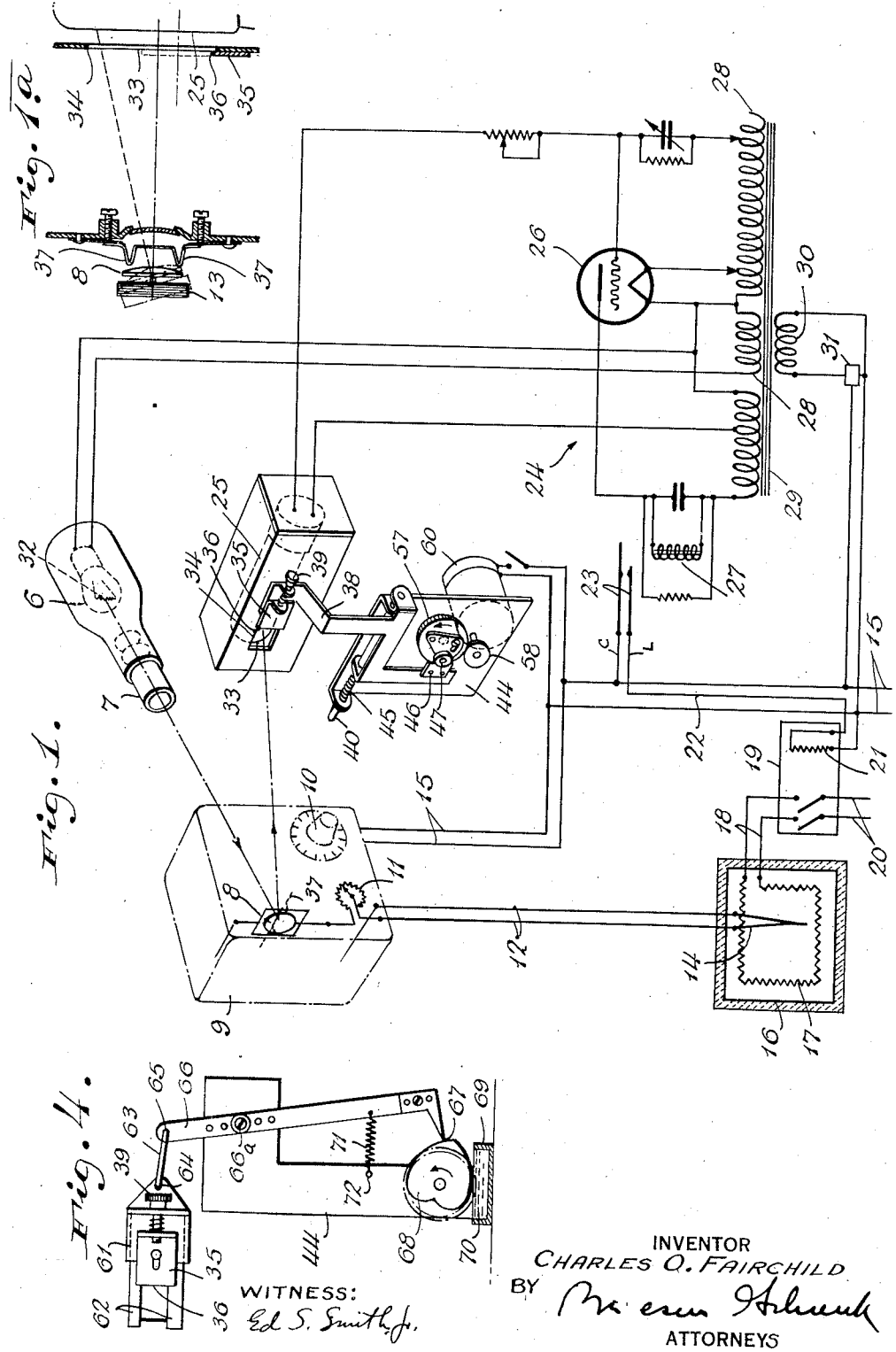

Patented Oct. 15, 1940

2,218,464

UNITED STATES PATENT OFFICE 2,218,464

THROTTLING REGULATOR FOR ELECTRIC FURNACES

Charles O. Fairchild, St. Albans, N. Y., assignor to Charles J. Tagliabue Mfg. Co., Brooklyn, N. Y., a corporation of New York Application December 14, 1937, Serial No. 179,797

10 Claims. (Cl. 236—69)

The present invention relates to methods of and means for regulation, and particularly for the regulation of a variable temperature by maintaining the rate of heat input in correspondence with the measured temperature.

It is a principal object of the present invention to provide economic methods of and means for controlling electric power by throttling, i. e. by holding the average value of the input within limits where the means provided to do this varies the duration of input cyclically at regular intervals, the duration varying in correspondence with the measured variable.

Another main object of the invention is to provide a regulator which is accurate and sensitive and has means for adjusting the sensitivity, in accordance with the requirements, to avoid hunting and at the same time maintain accurate regulation.

It is a particular object of the invention to provide a photoelectric controller having a movable mirror galvanometer and means for cyclically so interrupting a beam of light reflected from the mirror towards a phototube that the duration of exposure of the phototube to illumination corresponds with the position of the reflected light beam.

It is general practice to control the temperature of electric furnaces or ovens requiring more than a few kilowatts of power by off-on, or two-position, regulators in spite of the fact that such regulators act to increase and decrease the temperature in regular cycles, i. e. to cause hunting. Such non-throttling regulators are generally used because means for throttling are generally expensive, or wasteful of power, e. g., throttling controllers are available for adjusting such wasteful means as: a rheostat, a voltage regulator, a saturable reactor or transformer, or the means for controlling the grid voltage of a mercury-vapor power tube. All such means in throttling regulators have an unavoidable dead-zone caused not only by motor drift but also by the deadzone commonly met with in the measuring means or the means for detecting deflections of the measuring element.

In the present invention, a double-suspension mirror galvanometer is used as a measuring element, which element is free from solid friction, and a screen is arranged to oscillate between the mirror and a phototube in the path of the swinging reflected light beam. Thus, as the beam moves, the duration of the exposure of the phototube is varied without having any measurable deadzone. When the period of oscillation of the screen is sufficiently smaller than the natural period of oscillation of the furnace under off-on control, then the temperature waves from the heating element of the furnace have such a limited initial amplitude that, because of attenuation commonly present, the amplitude of the wave at the measuring element is too small to be detected by ordinary means. For example, in the regulation of a large furnace having a natural period of oscillation of ten or fifteen minutes under symmetrical off-on control, the period of oscillation of the screen may be made as large as two minutes with remarkable improvement of regulation over that with such longer period off-on control.

The basic idea of thus varying the duration of electric input of heat was described by Gouy in the French publication: Journal de Physique, vol. 6, 1897, pp. 479–483. Gouy oscillated a platinum wire extending downwardly above, and into contact with, a mercury meniscus which rose and fell in correspondence with the measured temperature, the duration of the contact in each cycle depending upon the temperature. Many inventors in the meantime have devised various apparatuses for varying the duration of electric input, which devices more often than not failed to follow the above described Gouy principle closely enough to achieve the excellent results of the use of this principle.

The photoelectric method herein disclosed for the practical application of the Gouy principle has been found to take full advantage of this principle, i. e. to attain true throttling control and to be free from any measurable deadzone. Gouy did not provide means for adjusting sensitivity, instead he taught that a certain length of stroke of his platinum wire gave satisfactory results. For a given type of motion, e. g., a simple harmonic, and a given period of oscillation, the velocity of traverse by the screen edge of its median position is directly proportional to the amplitude of oscillation and the rate of change of duration of exposure of the phototube with movement of the light beam at the median position of the screen edge varies inversely as the velocity of the edge at this position. It follows that the sensitivity of regulation can be readily altered by adjusting the amplitude, i. e. stroke, of the screen. Alternatively, this sensitivity may be predetermined by adjusting a rheostat in the galvanometer circuit, which adjustment alters the deflection of the galvanometer mirror for a given change in temperature.

Somewhat broadly, one object is to provide a new and advantageous method of process temperature regulation by setting up an electrical condition, e. g., thermocouple E. M. F., in correspondence with the temperature, sensing the value of the condition, oscillatably altering the sensation level, and intermittently heating the furnace according to the sensing. Another related object is the provision of an advantageous method of regulation of a variable by setting up an electrical condition in correspondence therewith, continuously indicating the value of the condition, feeding a quantity in regulating relation at a substantially constant rate and cyclically interrupting the feeding for a time in each cycle corresponding with the indication.

A specific object of the invention is to obtain utmost safety of regulation of furnace temperature by following the method of heating the furnace while a light beam is illuminating a phototube and not heating while the beam is interrupted or the light source or tube fail. A related object is the attainment of correspondence of average heat input with the position of the light image relative to the median line of the oscillations of the cut-off edge of the screen.

Further specific objects are the provision of means cooperating with the optical system and its phototube to keep the path of the light image within the limit of the phototube at that end of the path where the beam is not interrupted by the screen, to provide an arrangement in which the edge of the screen is normal to the plane of the light beam and path of the light image, the light image is narrower relative to its length, and the image is substantially parallel to the edge of the screen, to provide means for adjusting the screen edge relative to its oscillating means and to provide means for altering the extent and period of oscillation of the screen edge, which arrangement and combination produces the desired high sensitivity and relation between the path of the image and the oscillations of the screen edge.

Still another and useful result of the invention is that substantially continuous regulation is obtained even outside of the throttling range. In other words, the regulator is always functioning to correct for a departure from the desired temperature both within and without the throttling band, a mode of operation which is far different from and superior to that of any beater-type of regulator which cyclically measures the departure, is effective only within the operating range and also is responsive to changes only part of the time. In the present invention, the temperature indicating means is entirely unhampered and of low moment of inertia, and the arrangement is such that it is always acting to govern the heat input and is free to swing immediately upon a temperature change to a corresponding new position. This promptness of response is an additional and important stabilizing factor because "metering lag" is an important cause of hunting, and particularly so where extremely high sensitivities are available as in the present case.

These and other objects of my invention will appear to those skilled in the art from the accompanying drawings and specification, in which are illustrated and described several embodiments of the invention. It is my intention to claim all that I have disclosed which is new and useful.

In the drawings, wherein like characters indicate like parts thereon: Fig. 1 is a diagrammatic view, partially in perspective, of the preferred embodiment of the invention, the invention being here shown regulating the temperature of an electric furnace; Fig. 1a is a plan view, partially in section, of the galvanometer mirror and its stops, the phototube and its oscillating screen; Fig. 2 is a front view of the detail of the preferred embodiment of the means which governs the oscillations of the controlling system; Fig. 3 is a side elevation, partially in section, corresponding with Fig. 2; and Fig. 4 is a diagrammatic front elevation, partially in section, of a detail of an alternative embodiment of the oscillation governing means of Fig. 2.

Referring to Fig. 1, lamp 6 sends a beam of light through focusing-tube 7 to a galvanometer mirror 8 of potentiometer 9. Potentiometer 9 is provided with knob 10 for manually setting a chosen temperature and manually adjustable rheostat 11, in the circuit 12, connected in series with the galvanometer coil 13 and thermocouple 14, for alternating the sensitivity of potentiometer 9. Potentiometer 9 may be connected with A. C. supply 15 as shown when lamp 6 and the photoelectric means 24 are mounted within its case. Thermocouple 14 is located in electric furnace 16 which also contains heating resistor 17, both ends of which are attached by leads 18 with electromagnetic contactor means 19 to power supply line 20. Contactor means 19 includes coil 21, the ends of which are respectively connected to one line of A. C. supply 15 and the other by lead line 22 to the L terminal of relay switch 23, terminal C thereof being connected to the other line of A. C. supply 15. The arrangement is such that, when switch 23 is closed, electromagnetic contactor 19 connects power supply 20 with heating resistor 17, or any other means for supplying heat input when contactor 19 is closed. Relay switch 23 is operated by photoelectric means 24 including phototube 25, amplifier tube 26 and electromagnet 27 of relay 23, and secondaries 28 of transformer 29, primary 30 thereof being connected with A. C. supply lines 15 through voltage regulator 31, filament 32 of lamp 6 being also connected with one of the secondaries 28. Although the photoelectric means 24 shown is preferably used, still the invention is not limited to this particular circuit which has been used purely for purposes of illustration, many other appropriate circuits being suitable for use with the present invention for operating relay switch 23, provided that heat input to furnace 16 containing thermocouple 14 takes place while light shines on a photoresponsive element, in this case phototube 25.

In Fig. 1, the light beam from the galvanometer, is focused in the plane of screen 35 in front of the phototube 25 as a vertical image approximately $\frac{1}{20}''$ wide and $\frac{1}{2}''$ high, the phototube being horizontal, as is slot 33 in fixed screen 34 in which the phototube is mounted, this slot being about $\frac{3}{8}''$ high and about $1\frac{1}{2}''$ wide, and the cathode of phototube 25 being longer than slot 33. In front of this slot is movable screen 35, lefthand edge 36 of which is vertical and adapted to oscillate, when adjusting screw 39 is in its median position, about a median line $\frac{5}{16}''$ to the left of the right-hand vertical edge of slot 33 for the maximum distance $\frac{5}{16}''$ in either direction from the median line thus creating maximum throttling band having the width $\frac{5}{8}''$. The foregoing dimensions are purely for purposes of illustration and are not in any way limiting. As shown in Fig. 1a, stops 37 are provided for galvanometer mirror 8 to limit its motion so that the image is kept within slot 33, whenever it is deflected to the position as shown by the dotted lines. The means for oscillating screen 35 is best shown in Figs. 2 and 3. Referring to these figures, screen 35 is adjustably connected with slider 38 by adjusting screw 39 so that the position of screen edge 36 may be adjusted relative to the position of the median line. Slider 38 is affixed to cylindrical rod 40 by ears 41 of the slider and by lock screw 42. Rod 40 slides through guiding holes in two block portions 43 of stationary frame 44. Compression spring 45 surrounds rod 40 and presses against a face of lefthand stationary block 43 and a face of lefthand ear 41 of slider 38. Cam plate 46 is secured to slider 38 and is shown having a vertical edge which, however, may be modified as desired. Grooved roller 47 is rotatably mounted on pin 48 and restrained by the head thereof from appreciable axial movement. Pin 48 is adjustably attached to shaft 49 so that the radius of its throw is adjustable from 0" to $\frac{5}{16}$" so that the throttling band may vary from 0" at the median line to $\frac{5}{16}$" either side thereof to give the aforementioned $\frac{5}{8}$" width of throttling band. Shaft 49 is rotatably mounted in bearing 50 which is affixed to frame 44 and has spacing collar 51 secured on the rear end thereof and circular hub plate 52 secured on the front end thereof. Angularly adjustable arm 53 is pivotally mounted on plate 52 by stud pin 54 and provided with slot 55 for clamping bolt 56 which is threaded into plate 52, the arrangement and the length of slot being such as to give the aforementioned travel. Detachably secured to hub plate 52 is spur-gear 57 which meshes with spur-gear 58 which is detachably secured to shaft 59 of constant speed motor 60. Gears 57—58 and the speed of motor 60 are selected so that the period of oscillation of screen 35 is kept within reasonable bounds, e. g., 2 seconds to 5 minutes depending upon the thermal capacity of furnace 16, the temperature of which is being regulated. The period must be short enough so that the ripples in the furnace temperature due to the intermittent heat input are negligible. It is good practice to keep the period within the range 10 seconds to 2 minutes, depending upon the size or capacity of the furnace and of the electromagnetic contactor, in order to provide a satisfactorily long life of the contactor, the 10 seconds period being as short as is ordinarily justified by the response interval of the thermocouple, or other, means responsive to the furnace temperature.

Fig. 4 shows means for oscillating screen 35, alternative to the essentially "scotch-yoke" means of Figs. 1–3, which latter means is generally preferable on account of the simplicity and the accuracy of the generated relation between the position of the light beam and the corresponding duration of heat input intervals. However, the embodiment of Fig. 4 is useful in some cases, such, for example, as where an inverse relation is desirable, and which is required where the utmost range of substantially constant over-all sensitivity throughout the throttling range is to be attained as is established mathematically in my copending application, S. N. 168,445, filed Oct. 11/37. In Fig. 4, screen 35 is adjustably connected generally as before, by adjusting screw 39, with a slider 61 which slides between parallel guide rails 62 in the direction of the movement of the light image, i. e. horizontally in this figure. Link 63 is pivotally connected by pin 64 with slider 61 and by pin 65 with oscillated arm 66 which is pivotally mounted on frame 44 at the selected of a number of pivot holes along its length. The lower end of arm 66 has a relatively pointed portion 67 extending towards the left. Heart-shaped cam 68 is attached to shaft 49 and has detachably affixed thereto spur-gear 57, the center of shaft 49 being substantially on the level of pointed portion 67 of arm 66. The arrangement is such that arm 66 is substantially vertical when edge 36 of screen 35 is in its median position. The size of cam 68 is such as to provide a maximum throttling band, or total movement of edge 36, of $\frac{5}{8}$". Trough 69 contains oil 70 and is located below cam 68 so that the outer point thereof touches the oil in each revolution to keep the edge of cam 68 lubricated to thus keep the wear on point 67 to a practically negligible value. Tension spring 71 operatively connects arm 66 with stud 72 of frame 44 to bias arm 66 about its fixed pivot 66a in a clockwise direction and so as to maintain the lower end, i. e. pointed portion 67, thereof in continuous contact with the working edge of cam 68.

*Description of operation*

While the operation of the preferred embodiment shown in Figs. 1–3 has been described in some detail, the following more general description may give a clearer picture of the operation of the entire regulating system: As long as the temperature of thermocouple 14 in furnace 16 is steadily within the throttling band including the regulating temperature set by the dial of potentiometer 13, the light beam reflected from galvanometer mirror 12 has a substantially steady image at a corresponding position relative to the median line of the throttling band at phototube 25 and so that the lefthand edge 36 of screen 35 oscillates across it in each direction once in the total period of each cycle, e. g., one minute. Assuming that photoelectric means 24 has been arranged and adjusted to cause relay 23 to close whenever the light beam reaches the phototube, i. e. when the screen is not interposed, and open when the screen is interposed, the unscreened light duration and corresponding heat input period will be 30 seconds and the screened duration and corresponding heat-off period 30 seconds in each one-minute (60 seconds) cycle with the image at the median line. Upon a slight increase of the temperature of thermocouple 14, as e. g. due to the slight rise of the temperature resulting from an increase of the voltage of the power supply in lines 20, the light image will swing towards the right and away from the median line to a new position, e. g., half-way between the median line and the righthand edge of the throttling band defined by the travel of screen edge 36. In this case, the heat input, or "on", interval is reduced to $\frac{1}{3}$ of the total period while the "off" time is correspondingly lengthened to $\frac{2}{3}$ of the total period, instead of having the "on" and "off" periods respectively of $\frac{1}{4}$ and $\frac{3}{4}$ of the total period which would result from a constant velocity movement as produced by the embodiment of Fig. 4. In other words, the average heat input rate corresponds with, but is not strictly proportional to, temperature deviations within the range of the throttling band.

A continuous heat input may be arranged which is somewhat less than that required to maintain the set temperature, and thus the additional power carried by electromagnetic switch 19 may be reduced to the minimum consistent with a safe regulating margin, the amount of the additional power commonly being selected to give substantially equal "on" and "off" periods so that the light image will normally remain substantially on the median line and thus have an equal margin over and under. This mode of operation provides substantially equal rates of increase and decrease of furnace temperature during the "on" and "off" periods so that the response interval of the thermometric means including thermocouple 14, and potentiometer 13, including galvanometer mirror 12, is substantially the same upon a rise or fall of temperature in the normal operation of the regulator.

The operation of the device shown in Fig. 4 is in general as brought out in the device of Figs. 1–3 but with the advantage that substantially constant over-all sensitivity is obtained through the use of cam 68 which gives a saw-tooth movement with respect to time instead of the harmonic movement of the device of Figs. 1–3. As earlier mentioned the harmonic motion has a nearly enough constant sensitivity over the intermediate portions of the throttling band so that the alternative of Fig. 4 is not generally required. However, in the case where the heat input rate is considerably in excess of that required, the light beam will take its position near the righthand edge of slot 33 with the result that the sensitivity of the regulator in this region is objectionably increased. The heartshaped cam of Fig. 4 with its pointed saw-tooth action may give much better results (than the harmonic motion) when working near either peak since the sensitivity is practically the same there as elsewhere. It will be noted that the adjustable throw means for altering the sensitivity shown in Figs. 1–3 of the preferred embodiment, are replaced in the embodiment of Fig. 4 by the pivot pin 66a which is adjustable as desired.

The terms and expressions which I have employed are used as terms of description and not of limitation, and I have no intention, in the use of such terms and expressions, of excluding any equivalents of the features shown and described and portions thereof, but recognize that various modifications are possible within the scope of the invention claimed. Thus, it is within the scope of the invention to use, instead of the mechanical oscillating means disclosed to use electrical oscillating means as taught by the Tirrill Patents 1,001,711 and 1,147,574–5 for example; similarly one skilled in the art would likewise recognize that equivalents for an electromagnetically operable contactor for an electric furnace would be an electromagnetically operable valve for feeding fuel to a furnace containing a pilot flame, a motor for driving a stoker at an average speed corresponding with the average duration of the contact periods, and the solenoid-governed operation of such a stoker by electromagnetically operated clutches so that the stoker operates intermittently while its driving motor runs continuously, other devices fairly indicative of the range of equivalents being shown in Baule's French Patent 573465 of 1924. As used herein: sensitivity is the ratio of response per unit change; the level of indication is altered by turning dial 10 to that position at which its scale indicates, e. g., the set value desired, in which case the deflection of the galvanometer corresponds with and may be said to indicate the temperature upon a desired level of indication (the temperature drift from its set value) as, e. g., in the Kolowrat communication on pages 495–497 of the 1909 Journal de Physique and as shown in my allowed copending application, S. N. 125,135, filed Feb. 10/37, and the corresponding British Patent 511,280 which are for improvements in a conventional potentiometric indicator controller, in both of which the position of a slide wire contact is manually set (by dial 10 herein) to predetermine the value of the regulated electrical variable; changing the level of indication is accomplished by altering the position of the setting device to make the voltage opposing the thermocouple correspond with the set temperature so that the deflection of the light beam by the galvanometer corresponds with the departure of the temperature from that set; the relay is operated by the light image deflected by the galvanometer, at a position which is oscillatably altered, e. g., by the oscillating motion of the shield across the beam between the galvanometer and the phototube; the throttling range is the width of the band of positions of the image within which the shield can cause intermittent operation of the relay expressed in terms of the measured temperature, and the drift of the temperature within the throttling range and the consequent load error are compensated for by manually adjusting the shield by the reset screw 39, without upsetting the reading of the set temperature on the scale for knob 10, until the light beam is restored to its normal balancing position; the natural frequency of the furnace or "plant" as referred to in the claims is that of the hunting of the temperature with zero amplitude of oscillation of shield 35; a nearly constant-speed or "lineal" (with respect to time) motion is produced over at least the central approximately 70% of the travel of the shield with the oscillating means of Fig. 1 with a vertical cam and more if the cam 46 is slightly modified, while that of Fig. 4 can follow the lineal or any other desirable controlling relation over practically the full travel of the shield; the oscillating screen, e. g., modifies the relay-operating times in correspondence with the departure, indicated by the deflection of the image, of the value of the variable from that of a set balancing quantity, i. e., the departure from the set temperature in the indicator controller being disclosed by way of illustration; and the amplitude of the oscillations (and hence width of throttling range) is adjusted by altering the throw or effective radius of the center of roller 47 which gives cam 46 (and hence shield 35) an oscillating motion giving the desired sensitivity.

I claim:

1. A regulator for substantially maintaining a selected value of the temperature of a furnace by controlling the average rate of heat input to the furnace in corresponence with its temperature, that comprises, in combination, a temperature indicator sensitive to the furnace temperature, and including a setting means for directly altering the level of indication relative to a set value of the temperature, optical means including a mirror operatively connected to the indicator to displace a beam of light focused to an image along a path in correspondence with the indicated furnace temperature upon such level, a phototube in the path of the beam, means operatively connected to the phototube to control the heat input to the furnace at an average rate corresponding with the departure from the set value and to supply heat to the furnace at a constant rate and only as long as the light beam is on the phototube, a screen having an edge positioned in the path of light image between the mirror and the phototube, and means operatively connected with the screen to oscillate the latter continuously in the direction of the path of the image at a higher frequency than the natural frequency of the furnace, whereby the duration of heat supply in each cycle corresponds with the departure and the departure is substantially steady with a steady load on the furnace.

2. A regulator as set forth in claim 1 in which the edge of the screen is normal to the plane of the light beam, oscillation path, and path of the light image, the light image is narrow relative to its length, and the image is substantially parallel with the edge of the screen, whereby the sensitivity of control is high even though the arrangement be compact.

3. The combination set forth in claim 1 in which said temperature indicator includes a galvanometer whose deflection is in accordance with the difference between the set and the indicated values of the regulated temperature for positioning said mirror and means to alter the sensitivity of said galvanometer and hence to correspondingly alter the throttling range in which the shield oscillations can cause the heat controlling means to operate intermittently.

4. In a temperature regulator for a furnace, in combination, means sensitive to the temperature for positioning a light beam in correspondence therewith, a screen disposed in the path of the beam positions, means operably connected to the screen to cyclically oscillate the latter to create light impulse durations in correspondence with the beam position at a higher frequency than the natural frequency of the furnace, and photoresponsive means having a portion arranged to be illuminated by the beam for such duration and including means for causing the heat input to the furnace at a substantially constant rate and for durations corresponding with the light impulse durations.

5. In a temperature regulator for a furnace, means sensitive to the temperature for positioning a light beam in correspondence therewith, a screen disposed in the path of the beam positions, means operably connected to the screen to cyclically oscillate the latter to create light impulse durations in correspondence with the beam position, and photoresponsive means having a portion arranged to be illuminated by the beam and including means for controlling the heat input to the furnace in correspondence with the durations, said screen oscillating means being adapted and arranged to oscillate the screen at a higher frequency than the natural frequency of the furnace and to produce a substantially constant instantaneous rate of motion of the screen over a substantial portion of the travel of the latter.

6. In a temperature regulator for a furnace, in combination, means sensitive to the temperature for positioning a light beam in correspondence therewith, a screen disposed in the path of the beam positions, means operably connected to the screen to cyclically oscillate the latter to create light impulse durations in correspondence with the beam position, and photoresponsive means having a portion arranged to be illuminated by the beam and including means for controlling the heat input to the furnace in correspondence with the durations, said oscillating means being adapted to generate a substantially harmonic motion of the screen.

7. In a temperature regulator for a furnace, the combination of means sensitive to the temperature for positioning a light beam in correspondence therewith, a screen disposed in the path of the beam positions, means operably connected to the screen to cyclically oscillate the latter to create light impulse durations in correspondence with the beam position, and photoresponsive means having a portion arranged to be illuminated by the beam and including means for controlling the heat input to the furnace in correspondence with the durations, said oscillating means including a cam shaped to produce a uniformly constant instantaneous rate of motion of the screen between reversals thereof.

8. A temperature regulator for a furnace comprising means sensitive to the temperature for positioning a light image in correspondence therewith between predetermined limits, a screen, means for oscillating the screen in the path of the image at a higher frequency than the natural frequency of the furnace and within smaller limits than said predetermined limits, and photoresponsive means including a switch adapted and arranged to supply heat to the furnace at a substantially constant rate only while the unscreened image falls upon a light-sensitive portion of the photoresponsive means which portion is elongated in the direction of the path of the image.

9. In a temperature regulator for a furnace, the combination of means sensitive to the temperature for positioning a light beam in correspondence therewith, a photoresponsive means disposed within the path of the beam and having an edge operative to cause the illumination of the photo-responsive means by the beam to cease as the beam swings past the edge and away from the photo-responsive means, means acting upon one of said means to cause a cyclical oscillation of the relative positions of the beam and edge to create light impulses for the photo-responsive means corresponding in duration with the beam position, and means operatively connected to the photo-responsive means to control the average heat input to the furnace in correspondence with the duration by supplying heat to the furnace at a substantially constant rate for substantially the duration of each of said impulses.

10. In a regulator for an electrical quantity which is variable with time and having a servo-operated controlling means for the quantity, the combination of a continuously free means sensitive to the departure of the value of the variable quantity from that of a balancing quantity and constructed to position a light beam in correspondence with such departure, a photoresponsive means disposed within the path of the beam and having an edge effective to cause the illumination of the photoresponsive means by the beam to cease upon relative movement of the beam past the edge and away from the photoresponsive means, a relay for the servooperated controlling means and operatively connected with said photoresponsive means to govern the operation of the servooperated controlling means in accordance with the direction of departure of the value of the variable quantity from a predetermined value of the balancing quantity, and an oscillating means moving in regular cycles to gradually alter the relay-operating time in each cycle in dependence upon the position of the sensitive means and hence to cause the average duration of operation to correspond with the amount of the departure from said predetermined value in each cycle when within a throttling range.

CHARLES O. FAIRCHILD.